L. H. WRAY.
COLLAPSIBLE RIM,
APPLICATION FILED APR. 5, 1916.

1,265,412.

Patented May 7, 1918.

WITNESSES

INVENTOR
Lloyd H. Wray
BY
ATTORNEY

UNITED STATES PATENT OFFICE.

LLOYD H. WRAY, OF REEDSVILLE, PENNSYLVANIA.

COLLAPSIBLE RIM.

1,265,412.

Specification of Letters Patent.   Patented May 7, 1918.

Application filed April 5, 1916.   Serial No. 89,201.

*To all whom it may concern:*

Be it known that I, LLOYD H. WRAY, a citizen of the United States, residing at Reedsville, in the county of Mifflin and State of Pennsylvania, have invented certain new and useful Improvements in Collapsible Rims, of which the following is a specification.

This invention relates to a collapsible rim for vehicle wheels and the primary object is to provide a rim that may be easily adapted to be placed in position whereby a pneumatic tire may be conveniently mounted upon the rim without necessarily distorting the tire as is necessary in the ordinary type of automobile wheel rim.

A further object of this invention is the provision of a collapsible and demountable rim for vehicle wheels which consists of comparatively few parts and is simple in construction, but durable and well adapted to withstand the rough usage to which devices of this character are ordinarily subjected.

Another object of the invention is the provision of means for conveniently mounting a pneumatic tire upon the rim of a vehicle wheel without the use of the common expedient of pulling or pushing tools.

For a full description of the invention and the advantages and merits thereof, reference is to be had to the following description and the accompanying drawings, wherein is illustrated the preferred form of my invention, in which, Figure 1 is a side elevation, a small portion being broken away.

Figure 1:
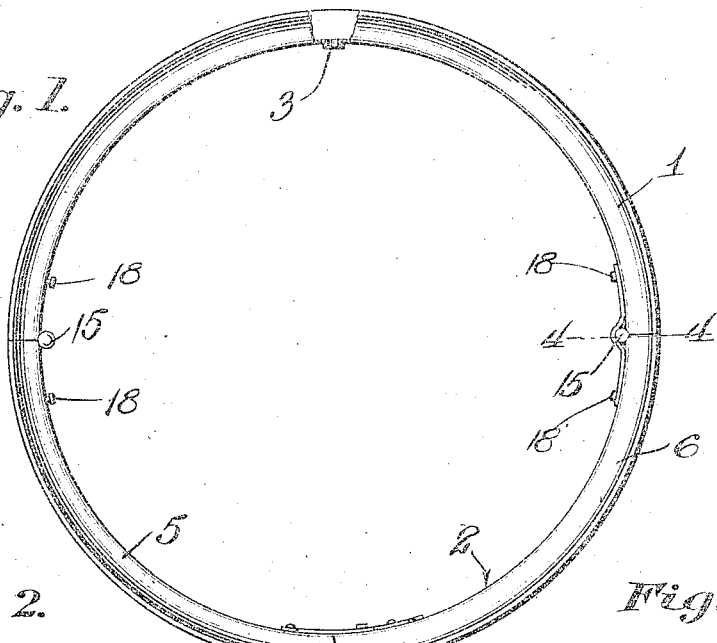
Figure 2:
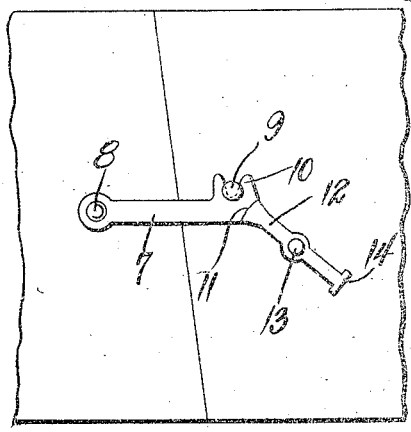
Fig. 2 is a plan of a fragment of the rim.

As shown by Fig. 1 of the drawing the rim is constructed of a pair of semi-circular segments 1 and 2, the segment 1 having an aperture 3 for the reception of the air valve of the ordinary pneumatic tire. The segment 2 is divided as at 4 to provide the two quarter sections 5 and 6. These quarter sections 5 and 6 are fastened together by a latch 7 which is pivoted on a pivot pin mounted adjacent one end of the quarter section 5 while a stud 9 is mounted on the end of the opposite section and is received by the bifurcated end 10 of the latch 7. By referring to Fig. 2 of the drawing, it will be observed that a curved edge 11 is formed on the latch 7 and receives the curved end of a locking lever 12 pivotally mounted on the pin 13 and provided with a head 14 at its free end. It is, of course, necessary that the means for locking the ends of a demountable rim of this character together, be as compact as possible so that the wheel of the vehicle may be received without cumbersome parts interfering with its reception. It is, therefore, the object of the above described latch to accomplish this purpose and it will be observed that the operation of the latch in the locking lever is extremely simple, it being only necessary to strike the head 14 with a hammer or other similar tool, thereby causing its curved end to disengage the curved edge 11 of the latch 7. The latch may be then swung on its pivot 8 and out of engagement with the stud 9 allowing the ends of the quarter sections 5 and 6 to be separated.

The ends of the semi-circular segments 1 and 2 are hingedly connected together by the hinges 15 whereby the sections 5 and 6 may be swung inwardly for permitting the rim to be engaged with the inner periphery of a pneumatic tire. Brace clips 16 are provided for the purpose of bracing the hinged sections during the operation of mounting the tire upon the rim. Each brace clip 16 is provided with an arcuate central portion 19 designed to overlie the hinge 15, while each end of each clip has its ends provided with right angularly extended portions which are bifurcated as at 17 to receive the studs 18 carried by the ends of the sections 1 and 2, adjacent the hinges 15.

Figure 3:
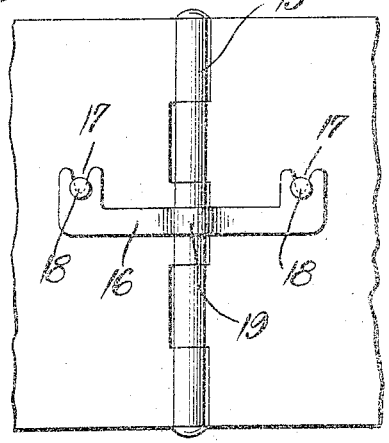
Fig. 3 is a plan of a fragment of the rim showing the manner of bracing the hinged segments.
Figure 4:
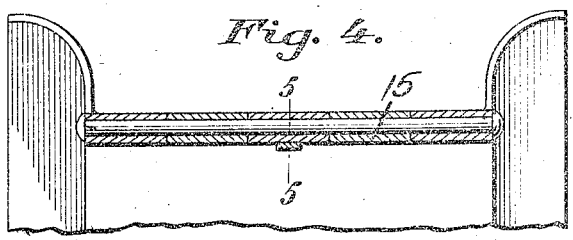
Fig. 4 is a section on the line 4—4 of Fig. 1.
Figure 5:
Fig. 5 is a section on the line 5—5 of Fig. 4.

The operation of the device is as follows: The latch 7 will be opened thus disconnecting the sections 5 and 6. This will permit the sections 5 and 6 to swing upon their hinges, inwardly toward the center of the rim. The rim may then be conveniently placed within the pneumatic tire so that the tire will embrace the rim and the latter may be moved into engagement with the inner periphery of the tire. Now, by forcing one of the quarter sections 5 and 6 outwardly, the corresponding brace clip may be placed in position as shown in Fig. 3 of the drawing. This clip will retain the section in position until the other clip has been placed in position on the opposite side of the rim. It is obvious that these clips will thus hold the sections 5 and 6 in sufficiently rigid position to permit the latch to be locked, after which the clips may be removed since it will then be impossible for the hinges to act. It is obvious, that the tire may be easily mounted upon the rim in this manner without the use of the common expedient of pulling or pushing tools generally employed with the ordinary type of rim.

I claim:

A demountable vehicle wheel rim comprising a plurality of rim segments hingedly connected together, a pair of studs arranged one on each side of each hinged connection and projecting inwardly from the rim section, said studs being adapted to coöperate with a tire rim assembling tool while the tire is being mou ed on the rim.

In testimony whereof I affix my signature in presence of two witnesses.

LLOYD H. WRAY.

Witnesses:
JOHN C. WERTS,
J. BERTRAM WERTS.